(12) United States Patent
Lee et al.

(10) Patent No.: US 11,396,475 B2
(45) Date of Patent: Jul. 26, 2022

(54) QUANTUM DOT GLASS AGING DEVICE AND AGING METHOD THEREOF

(71) Applicant: Samsung Display Co., Ltd., Yongin-Si (KR)

(72) Inventors: Yongjun Lee, Hwaseong-si (KR); Taegil Kang, Hwaseong-si (KR); Youjin Seo, Hwaseong-si (KR); Kyu-Hun Shim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 551 days.

(21) Appl. No.: 16/523,294

(22) Filed: Jul. 26, 2019

(65) Prior Publication Data

US 2020/0148592 A1 May 14, 2020

(30) Foreign Application Priority Data

Nov. 13, 2018 (KR) ........................ 10-2018-0138801

(51) Int. Cl.
| | | |
|---|---|---|
| C03C 23/00 | (2006.01) | |
| C03C 14/00 | (2006.01) | |
| C03C 4/12 | (2006.01) | |
| B82Y 20/00 | (2011.01) | |
| G02F 1/017 | (2006.01) | |

(52) U.S. Cl.
CPC ............ *C03C 23/0015* (2013.01); *C03C 4/12* (2013.01); *C03C 14/006* (2013.01); *B82Y 20/00* (2013.01); *C03C 2214/16* (2013.01); *G02F 1/01791* (2021.01)

(58) Field of Classification Search
CPC ............ C03C 23/0005; C03C 23/0015; C03C 23/001; C03C 23/002; C03C 4/12; C03C 4/006; G02F 1/01791
USPC .......................................................... 65/441
See application file for complete search history.

(56) References Cited

U.S. PATENT DOCUMENTS

| | | | |
|---|---|---|---|
| 9,209,165 B2 | 12/2015 | Dayringer et al. | |
| 2020/0043407 A1* | 2/2020 | Konishi | ............... G09G 3/3413 |

FOREIGN PATENT DOCUMENTS

| | | |
|---|---|---|
| JP | 6265253 B1 | 1/2018 |
| KR | 101016387 B1 | 2/2011 |
| KR | 1020160074494 A | 6/2016 |
| KR | 1020170011485 A | 2/2017 |
| KR | 1020180062204 A | 6/2018 |

* cited by examiner

*Primary Examiner* — Christopher M Raabe
(74) *Attorney, Agent, or Firm* — Cantor Colburn LLP

(57) ABSTRACT

A quantum dot ("QD") glass aging device including a bottom part including a flat surface defined by a first direction and a second direction intersecting the first direction; a side wall part including a side surface defined by the first direction and a third direction intersecting the bottom part, and a seating part disposed between the bottom part and the side wall part. The seating part includes a plurality of protrusion parts extending in the first direction and arranged in the second direction. A plurality of QD glasses is arranged on the plurality of protrusion parts. A plurality of light sources is disposed in the plurality of grooves defined between the protrusion parts and between the side wall part and a first protrusion part adjacent to the side wall part. Heights of upper surfaces of the protrusion parts gradually decrease from the side wall part to the bottom part.

20 Claims, 12 Drawing Sheets

QUANTUM DOT GLASS AGING DEVICE AND AGING METHOD THEREOF

This application claims priority to Korean Patent Application No. 10-2018-0138801, filed on Nov. 13, 2018, and all the benefits accruing therefrom under 35 U.S.C. § 119, the content of which in its entirety is herein incorporated by reference.

BACKGROUND

1. Field

Exemplary embodiments of the invention herein relate to a quantum dot ("QD") glass aging device and an aging method thereof.

2. Description of the Related Art

Generally, a display device includes a display panel including a plurality of pixels and a backlight unit for providing light to the display panel. The backlight unit includes a plurality of light source units for generating light, and the plurality of pixels displays images using the light provided from the plurality of light source units.

Recently, a backlight unit including a quantum dot ("QD") layer disposed on a light guide plate is used to improve color purity. The light guide plate on which the QD layer is disposed is defined as a QD glass. However, when the QD layer is disposed on the light guide plate, light transmittance is lowered by the QD layer, so that brightness is lowered. Luminance is lowered from a light-incident part of the QD glass to a light-out part of the QD glass. Therefore, luminance uniformity of the QD glass is lowered. The light-incident part is one side of the QD glass where the light is incident, and the light-out part is an opposite side of the light-incident part.

In order to solve this problem, an aging process for QD glass is performed. The aging process is performed by placing and fixing the QD glass and a light source on a bottom chassis and driving the light source for a predetermined time. The light generated from the light source is provided to the QD glass for a predetermined time, and the light guided upwardly in the light guide plate continuously transmits the QD layer.

SUMMARY

When light is continuously transmitted through a quantum dot ("QD") layer, luminance of a QD glass increases, and particularly, luminance of the light-out part having a lower luminance is increased. As a result, luminance uniformity of the QD glass is increased. A time that light is provided to the QD glass is set to the time the luminance of the QD glass no longer increases. However, an aging process is performed only on one QD glass, so that an efficiency of the process deteriorates.

Exemplary embodiments of the invention provide a QD glass aging device capable of improving the efficiency of the process and an aging method thereof.

An exemplary embodiment of the invention provides a QD glass aging device including a bottom part including a flat surface defined by a first direction and a second direction intersecting the first direction, a side wall part including a side surface defined by the first direction and a third direction intersecting the bottom part, and a seating part disposed between the bottom part and the side wall part, where the seating part includes a plurality of protrusion parts extending in the first direction and arranged in the second direction, the plurality of protrusion parts on which a plurality of QD glasses is disposed, where a plurality of light sources is disposed in a plurality of grooves defined between the plurality of protrusion parts and between the side wall part and a first protrusion part adjacent to the side wall part, where heights of upper surfaces of the plurality of protrusion parts gradually decrease from the side wall part to the bottom part.

In an exemplary embodiment of the invention, a QD glass aging method includes preparing a jig part including a seating part including a plurality of protrusion parts extending in a first direction and arranged in a second direction intersecting the first direction, a side wall part extending upwardly from a first side of opposing sides of the seating part facing each other in the second direction, and a bottom part extending from a second side of the opposing sides of the seating part in the second direction, disposing a plurality of light sources in a plurality of grooves defined between the plurality of protrusion parts and between the side wall part and a first protrusion part adjacent to the side wall part, disposing a plurality of QD glasses on the plurality of protrusion parts, respectively, and providing light generated from the plurality of light sources to the plurality of QD glasses for a first time, where the plurality of protrusion parts is disposed higher than the bottom part, where heights of the protrusion parts gradually decrease from the side wall part to the bottom part, where depths of the plurality of grooves gradually decrease from the side wall part to the bottom part.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
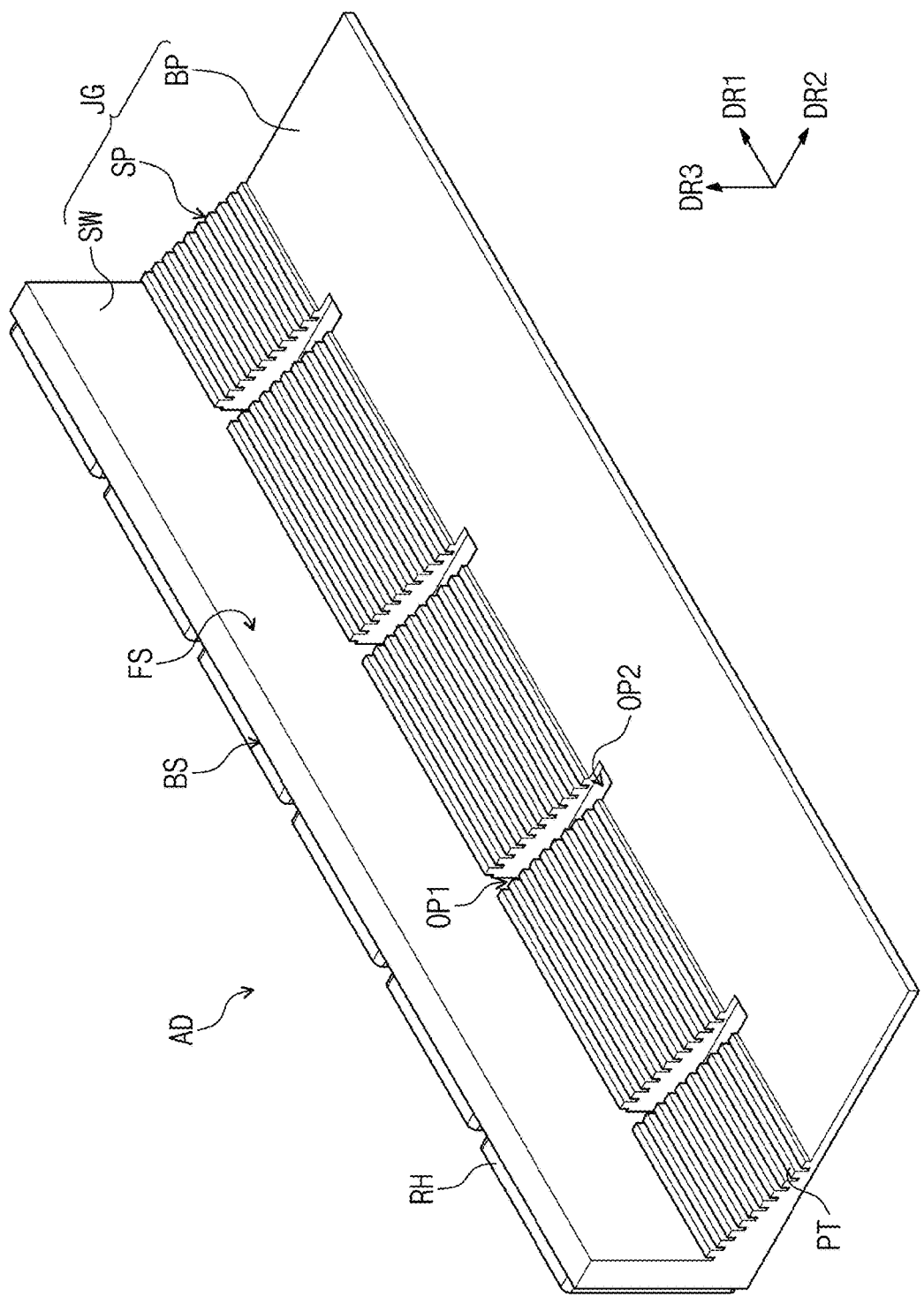
FIG. 1 is a perspective view of an exemplary embodiment of a front surface of a jig part of a quantum dot ("QD") glass aging device according to the invention.

In this specification, when it is mentioned that a component (or, an area, a layer, a part, etc.) is referred to as being "on", "connected to" or "combined to" another component, this means that the component may be directly on, connected to, or combined to the other component or a third component therebetween may be present.

Like reference numerals refer to like elements. Additionally, in the drawings, the thicknesses, proportions, and dimensions of components are exaggerated for effective description.

"And/or" includes all of one or more combinations defined by related components.

It will be understood that the terms "first" and "second" are used herein to describe various components but these components should not be limited by these terms. The above terms are used only to distinguish one component from another. For example, a first component may be referred to as a second component and vice versa without departing from the scope of the invention. The singular expressions include plural expressions unless the context clearly dictates otherwise.

In addition, terms such as "below", "the lower side", "on", and "the upper side" are used to describe a relationship of configurations shown in the drawing. The terms are described as a relative concept based on a direction shown in the drawing.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as terms commonly understood by those skilled in the art to which this invention belongs. Also, terms such as terms defined in commonly used dictionaries should be interpreted as having meaning consistent with meaning in the context of the related art, and unless the term is interpreted in an ideal or overly formal sense, they are explicitly defined here.

In various embodiments of the invention, the term "include," "comprise," "including," or "comprising," specifies a property, a region, a fixed number, a step, a process, an element and/or a component but does not exclude other properties, regions, fixed numbers, steps, processes, elements and/or components.

Hereinafter, embodiments of the invention are described in more detail with reference to the accompanying drawings.

Figure 2:
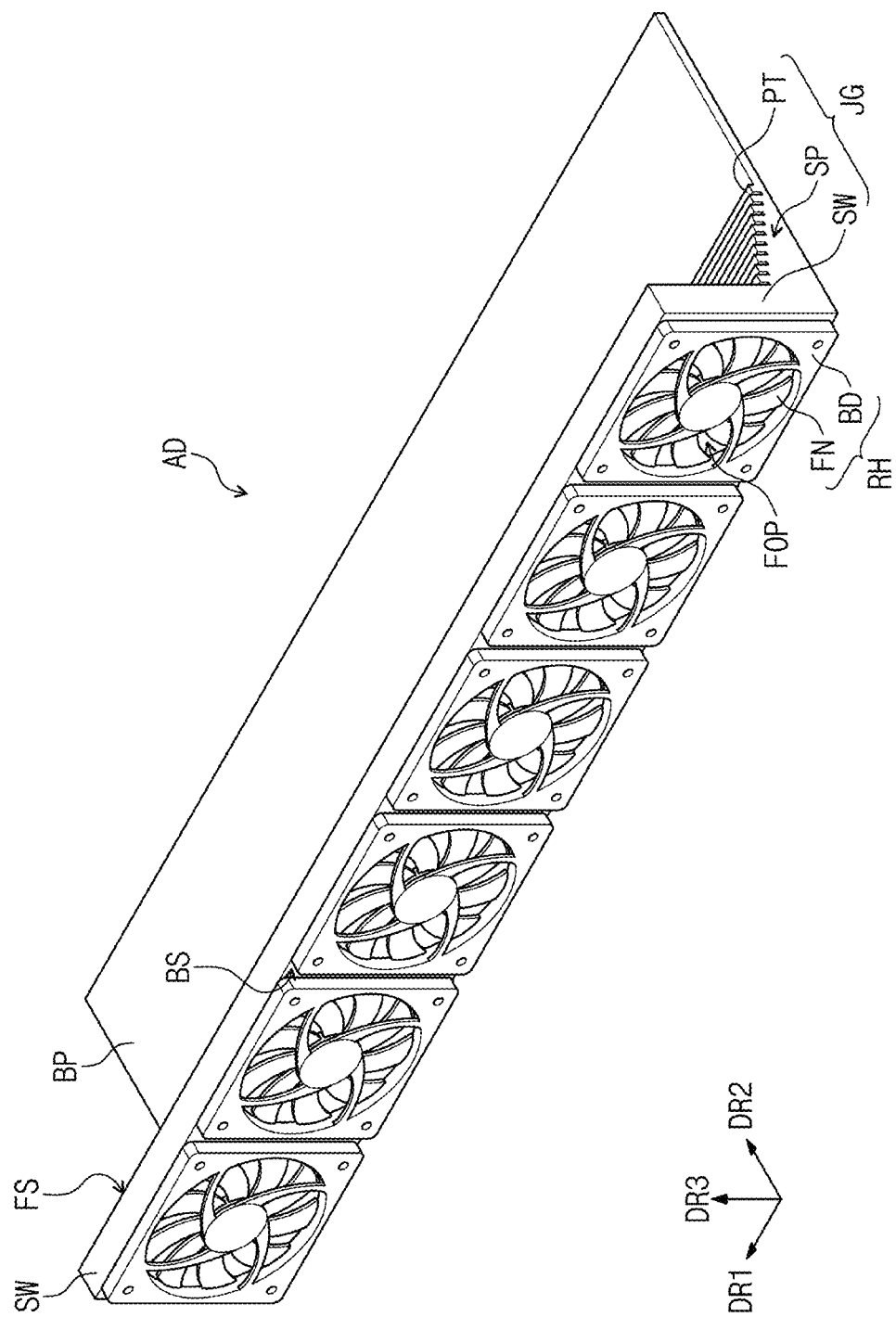
FIG. 2 is a perspective view of the rear surface of the jig part shown in FIG. 1.
Figure 3:
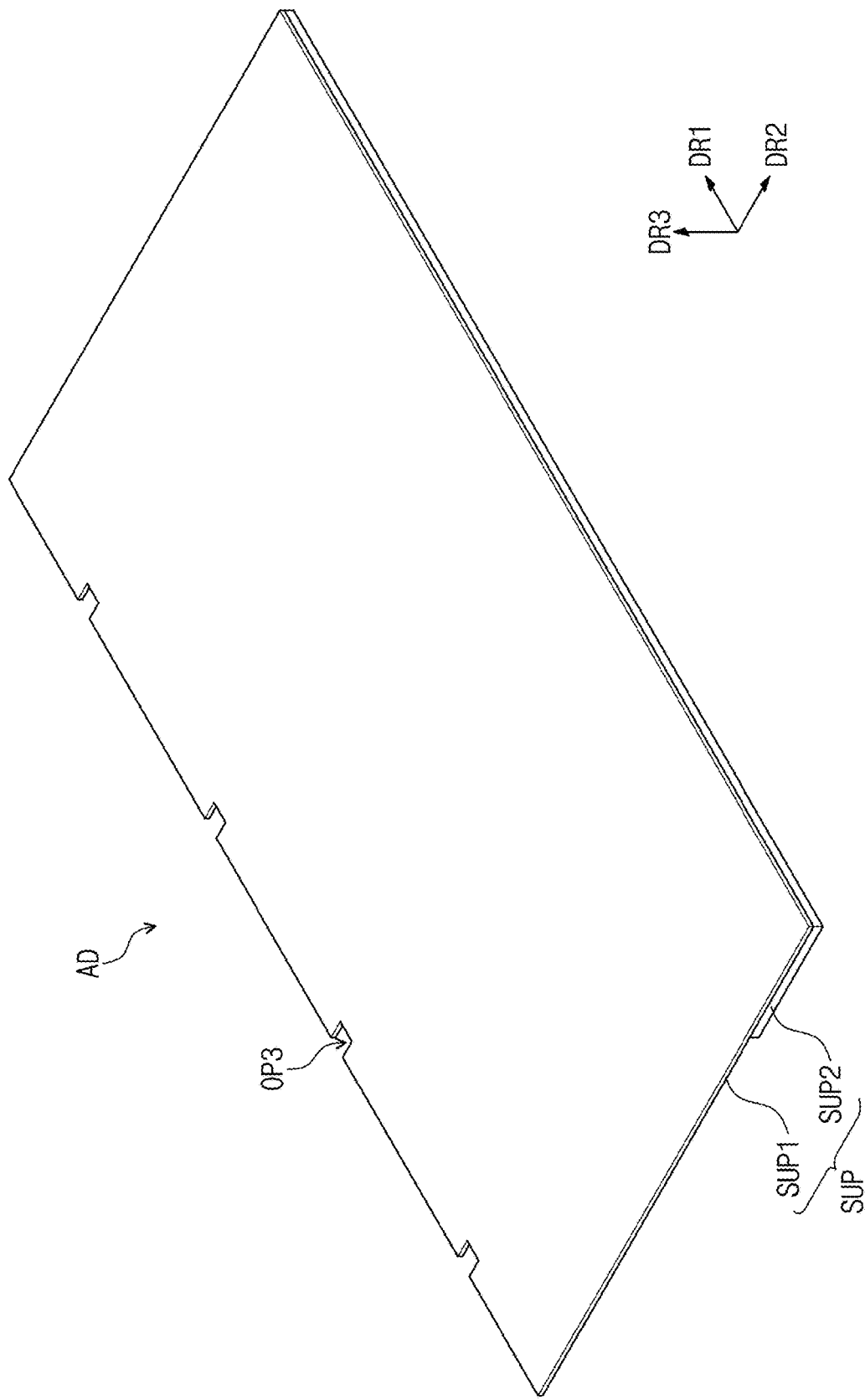
FIG. 3 is a perspective view of an exemplary embodiment of a support part of a QD glass aging device according to the invention.

FIG. 1 is a perspective view of an exemplary embodiment of a front surface of a jig part of a quantum dot ("QD") glass aging device according to the invention. FIG. 2 is a perspective view of the rear surface of the jig part shown in FIG. 1. FIG. 3 is a perspective view of an exemplary embodiment of a support part of a QD glass aging device according to the invention.

Referring to FIGS. 1, 2, and 3, a QD glass aging device AD according to an exemplary embodiment of the invention may include a jig part JG, a support part SUP, and a heat dissipating part RH. In an exemplary embodiment, the jig part JG may include aluminum, for example. In an exemplary embodiment, the jig part JG may be manufactured through an extrusion molding method, for example. The configuration in which the support part SUP is connected to the jig part JG will be described in detail below with reference to FIG. 5.

Referring to FIG. 1, the jig part JG includes a bottom part BP, a side wall part SW, and a seating part SP disposed between the bottom part BP and the side wall part SW. The bottom part BP may have a flat shape. In an exemplary embodiment, the bottom part BP may have a flat surface defined by a first direction DR1 and a second direction DR2 that intersects the first direction DR1, for example. The bottom part BP may extend longer in the first direction DR1 than the second direction DR2.

Hereinafter, the direction intersecting the flat surface defined by the first and second directions DR1 and DR2 is defined as a third direction DR3. The third direction DR3 may intersect substantially perpendicular to the flat surface defined by the first and second directions DR1 and DR2.

The side wall part SW may include a side surface defined by the first direction DR1 and the third direction DR3. The side wall part SW may extend longer in the first direction DR1 than the third direction DR3.

The seating part SP may include a plurality of protrusion parts PT extending in a first direction DR1 and arranged in a second direction DR2. The heights of the protrusion parts PT may be gradually lowered from the side wall part SW to the bottom part BP so as to have a stepped shape. The heights of the protrusion parts PT may be higher than that of the bottom part BP.

A plurality of first opening parts OP1 arranged in a first direction DR1 may be defined in the seating part SP. The first opening parts OP1 may extend in a second direction DR2. The first opening parts OP1 may extend to the end of the seating part SP in the second direction DR2. The first opening parts OP1 may be defined by penetrating predetermined portions of the seating part SP in a third direction DR3.

A plurality of second opening parts OP2 corresponding to the first opening parts OP1, respectively, may be defined in the bottom part BP. The second opening parts OP2 may be defined in predetermined portions of the bottom part BP adjacent to the seating part SP. The second opening parts OP2 may be defined by penetrating predetermined portions of the bottom part BP in a third direction DR3. Each of the second opening parts OP2 may be defined as an integral space together with a corresponding first opening part OP1 of the first opening parts OP1.

Substantially, the bottom part BP, the side wall part SW, and the seating part SP may be unitary. In an exemplary embodiment, the side wall part SW may extend from one side to the other (for example, in the third direction DR3) of opposing sides of the seating part SP facing each other in the second direction DR2, and the bottom part BP may extend from the other side of the seating part SP in the second direction DR2, for example. A surface adjacent to the seating part SP of opposing sides of the side wall part SW facing each other in the second direction DR2 is defined as a front surface FS of the side wall part SW, and the opposite face of the front surface FS is defined as the back surface BS of the side wall part SW. A plurality of heat dissipating parts RH may be disposed on the back surface BS. In an exemplary embodiment of the invention, the heat dissipating part RH may be provided in plural, but not limited thereto, and one heat dissipating part may be disposed on the back surface BS.

Referring to FIG. 2, the heat dissipating parts RH may be connected to a back surface BS. Each of the heat dissipating parts RH may include a body part BD having a rectangular rim and defining an opening part FOP and a fan FN disposed in the opening part FOP. The fan FN may rotate to form airflow from the back surface BS toward the outside of the back surface BS. Therefore, the heat generated in the jig part JG may be released to the outside by the heat dissipating parts RH.

In an exemplary embodiment, referring to FIG. 3, the support part SUP may include aluminum or stainless steel, for example. The support part SUP may include a first support part SUP1 having a flat surface defined by the first and second directions DR1 and DR2 and a second support part SUP2 disposed below the first support part SUP1.

A plurality of third opening parts OP3 may be defined on one side of opposing sides of the first support part SUP1 facing each other in the second direction DR2. The third opening parts OP3 may be defined by penetrating predetermined portions of one side of the first support part SUP1 in a third direction DR3. The third opening parts OP3 may correspond to the second opening parts OP2, respectively. Substantially, when the support part SUP is coupled to the jig part JG, the third opening parts OP3 may overlap the second opening parts OP2, respectively.

The size of the second support part SUP2 may be smaller than the size of the first support part SUP1. Here, the size may mean the area of the configuration when viewed in the third direction DR3. The second support part SUP2 may be adjacent to the other side of the opposing sides of the first support part SUP1 facing each other in the second direction DR2.

Illustratively, the first support part SUP1 and the second support part SUP2 may be manufactured separately and connected to each other, for example. However, the invention is not limited thereto, and the first and second support parts SUP1 and SUP2 may be unitary.

Figure 4:
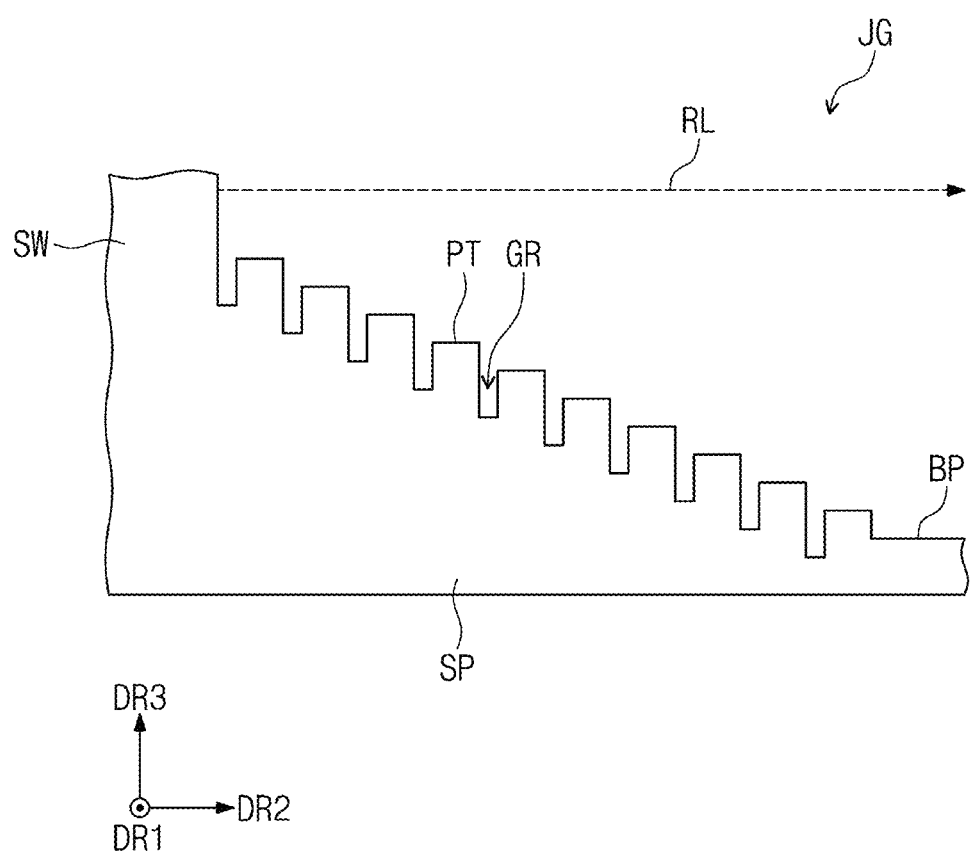
FIG. 4 is an enlarged view of the protrusion parts shown in FIG. 1.

FIG. 4 is an enlarged view of the protrusion parts shown in FIG. 1.

Illustratively, the side surfaces of the protrusion parts PT viewed in the first direction DR1 are enlarged and shown in FIG. 4, for example.

Referring to FIG. 4, the protrusion parts PT may have a rectangular shape. The upper surfaces of the protrusion parts PT may have flat surfaces defined by the first and second directions DR1 and DR2. The heights of the upper surfaces of the protrusion parts PT may be higher than that of the bottom part BP. The heights of the upper surfaces of the protrusion parts PT may be gradually lowered from the side wall part SW to the bottom part BP. The heights of the upper surfaces of the protrusion parts PT may be defined by the heights measured based on the lower surface of the seating part SP.

The order of the protrusion parts PT may be increased from the side wall part SW to the bottom part BP. A plurality of grooves GR may be defined between the protrusion parts PT and between the side wall part SW and the first protrusion part PT adjacent to the side wall part SW. The order of the grooves GR may be increased from the side wall part SW to the bottom part BP like the protrusion parts PT. In an exemplary embodiment, the groove GR between the side wall part SW and the first protrusion part PT may be the first groove GR, for example.

The depths of the grooves GR may be gradually lowered from the side wall part SW to the bottom part BP. The depths of the grooves GR may be defined by the depths measured based on a hypothetical line RL disposed higher than the first protrusion part PT and parallel to the second direction DR2.

Illustratively, ten protrusion parts PT and ten grooves GR are shown, for example, but the number of protrusion parts PT and the number of grooves GR are not limited thereto.

Figure 5:
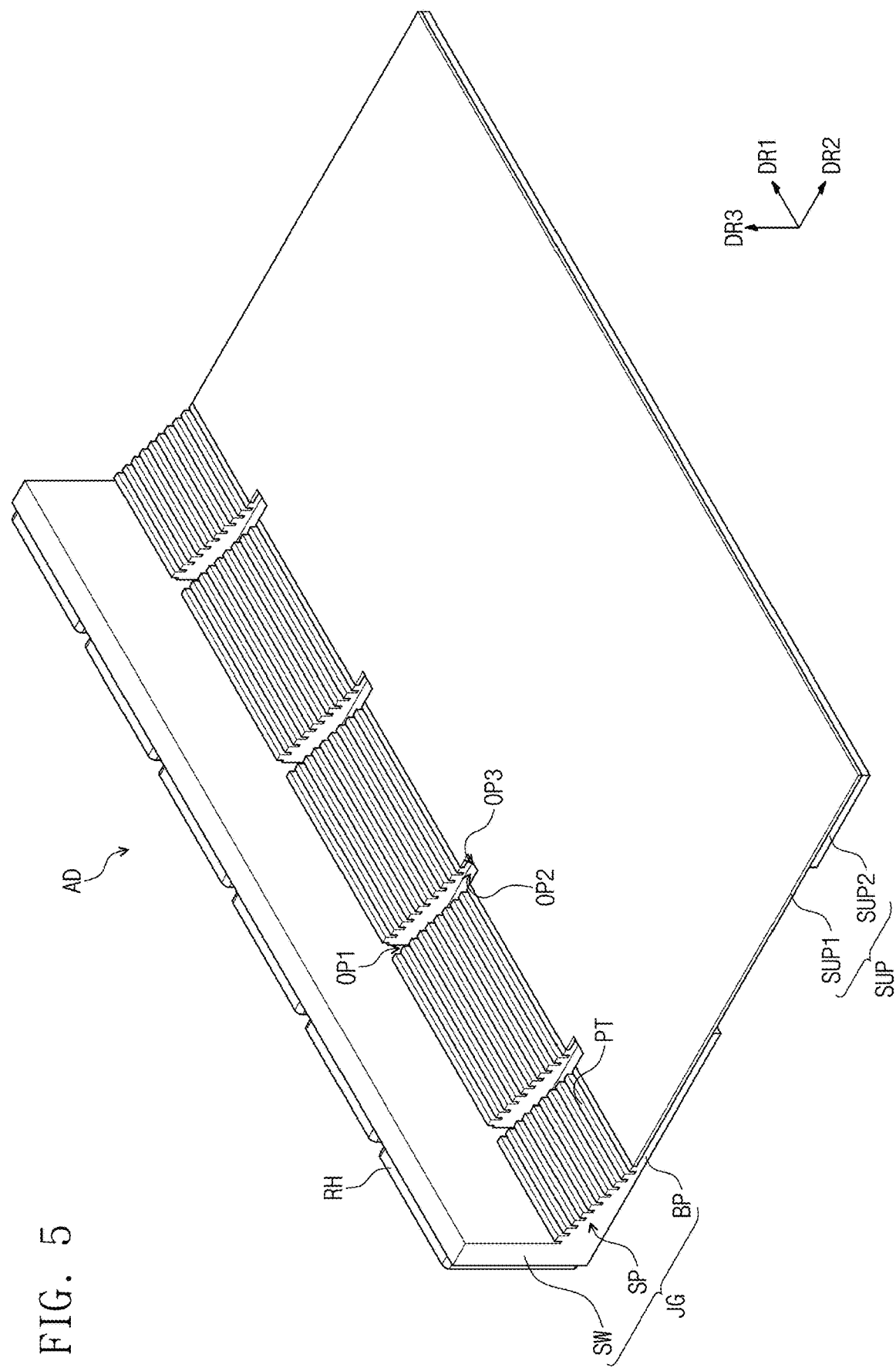
FIG. 5 is a view illustrating a state in which the support part shown in FIG. 3 is coupled to the jig part shown in FIG. 1.

FIG. 5 is a view illustrating a state in which the support part shown in FIG. 3 is coupled to the jig part shown in FIG. 1.

Referring to FIG. 5, the support part SUP may be disposed on the bottom part BP. In an exemplary embodiment, a portion of the first support part SUP1 adjacent to one side of the first support part SUP1 may be disposed on the bottom part BP, for example. The first support part SUP1 may extend further in the second direction DR2 than the bottom part BP. The third opening parts OP3 may overlap the second opening parts OP2 defined in the bottom part BP, respectively. The second support part SUP2 may be spaced apart from the bottom part BP, and disposed below the first support part SUP1.

Figure 6:
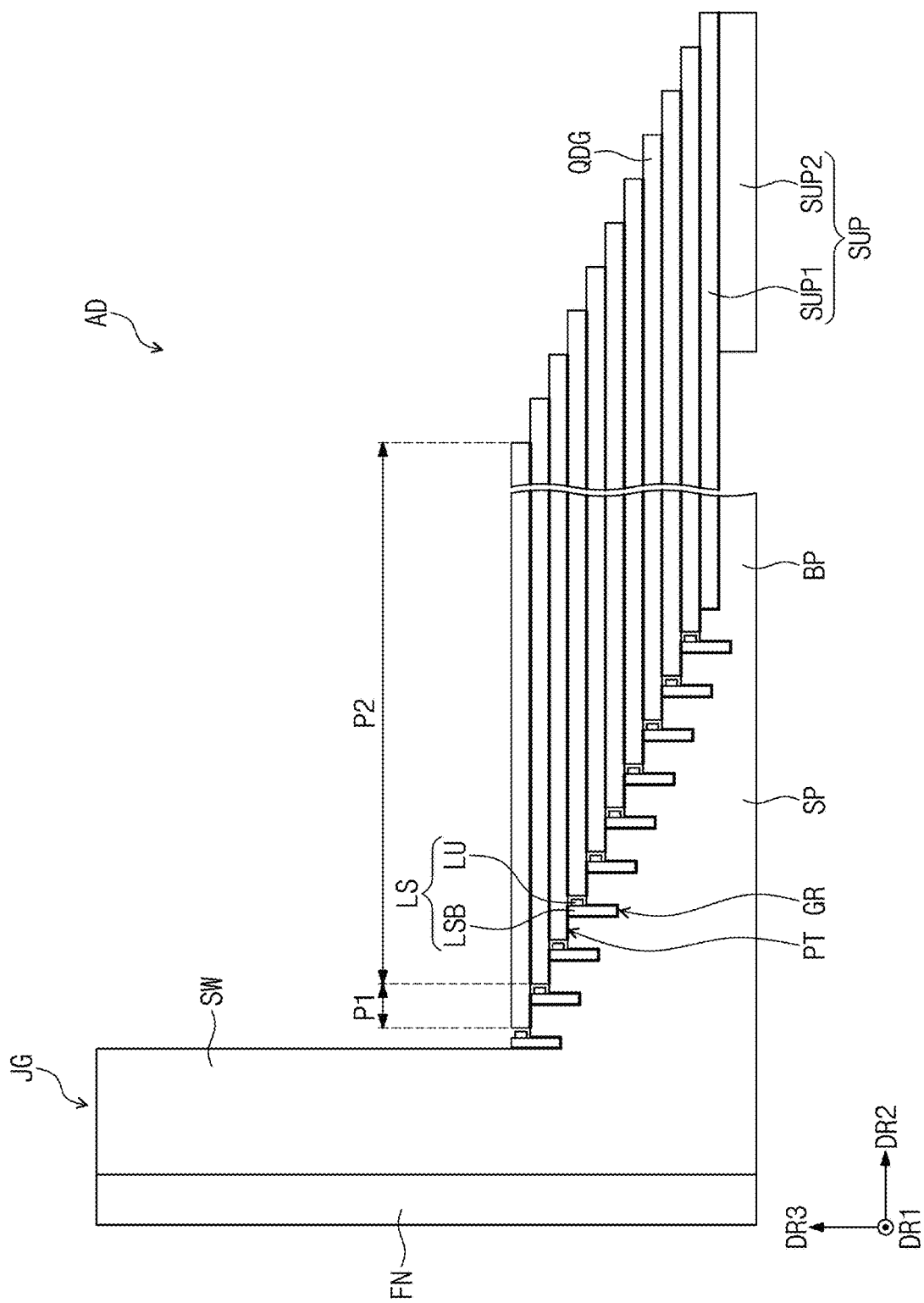
FIG. 6 is a view illustrating an exemplary embodiment of light sources and QD glasses disposed in a QD glass aging device according to the invention.
Figure 7:
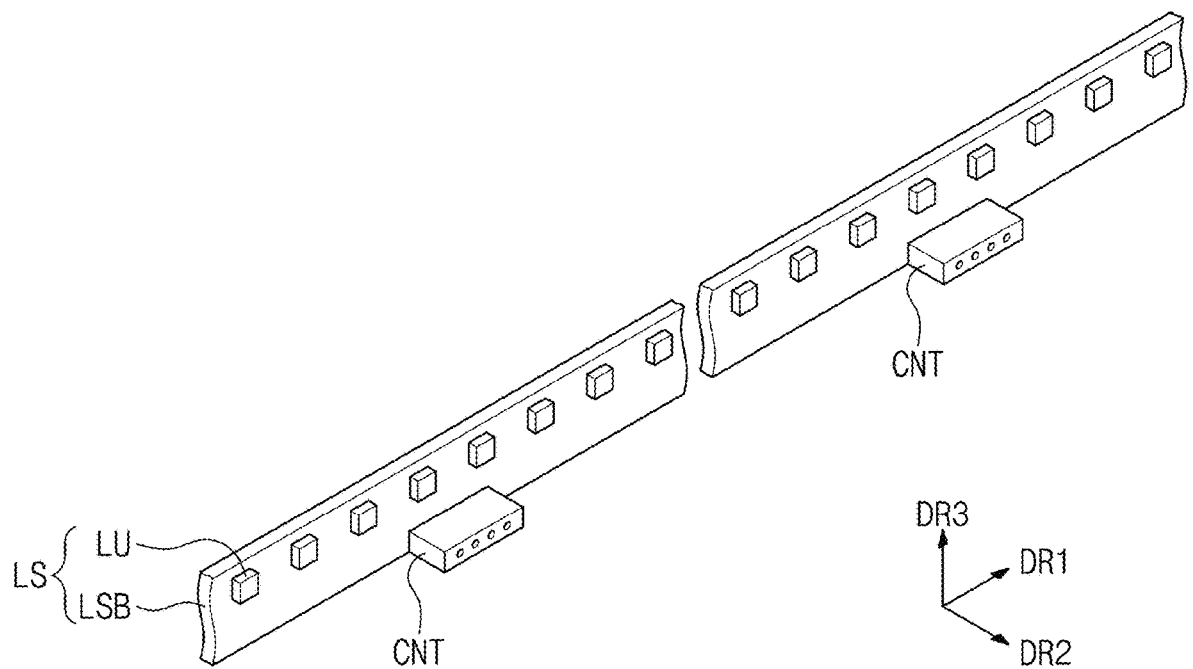
FIG. 7 is a perspective view of one light source shown in FIG. 6.

FIG. 6 is a view illustrating an exemplary embodiment of light sources and QD glasses disposed in a QD glass aging device according to the invention. FIG. 7 is a perspective view of one light source shown in FIG. 6.

For convenience of explanation, the side surface of the QD glass aging device AD as viewed in the first direction DR1 is shown in FIG. 6, and a portion of the light source LS is shown in FIG. 7.

Referring to FIG. 6, a plurality of light sources LS and a plurality of QD glasses QDG may be disposed in the QD glass aging device AD. The light sources LS may be respectively disposed in the grooves GR and the QD glasses QDG may be disposed on the protrusion parts PT.

Illustratively, ten light sources LS and ten QD glasses QDG are disposed in the grooves GR and protrusion parts PT, for example, but the number of light sources LS and the number of QD glasses QDG disposed in the grooves GR and protrusion parts PT may not be limited thereto. In an exemplary embodiment, as needed, fewer than ten light sources LS and fewer than ten QD glasses QDG may be disposed in the grooves GR and the protrusion parts PT, for example.

The order of the QD glasses QDG may be increased according to the arrangement order of the protrusion parts PT. In an exemplary embodiment, from the QD glass QDG disposed on the first protrusion part PT adjacent to the side wall part SW to the QD glass QDG disposed on the last protrusion part PT adjacent to the bottom part BP, the order of the QD glasses QDG may be increased, for example.

The k-th QD glass QDG of the QD glasses QDG may be disposed on the k-th protrusion part PT, the (k+1)-th light source LS, and the (k+1)-th QD glass QDG where k is a natural number. One side of the k-th QD glass QDG may be disposed on the k-th protrusion part PT. One side of the k-th QD glass QDG may be defined as one side closer to the side wall part SW of the opposing sides of the k-th QD glass QDG facing each other in the second direction DR2.

The k-th QD glass QDG may include a first portion P1 disposed on the k-th first protrusion part PT and the (k+1)-th light source LS and a second portion P2 disposed on the (k+1)-th QD glass QDG. The lower surface of the second portion P2 of the k-th QD glass QDG may contact the upper surface of the (k+1)-th QD glass QDG.

Referring to FIG. 7, a light source LS may include a light source substrate LSB, a plurality of light source units LU disposed (e.g., mounted) on the light source substrate LSB, and a plurality of connectors CNT connected to the light source substrate LSB. The number of connectors CNT may be less than the number of light source units LU.

The light source substrate LSB may have a rectangular shape with long sides in a first direction DR1 and short sides in a third direction DR3. The light source units LU may be disposed on one side of the opposing sides of the light source substrate LSB facing each other in the second direction DR2. The light source units LU may be arranged in the first direction DR1. The light source units LU may be disposed at even intervals in the first direction DR1. The light source units LU may be adjacent to the upper end of the light source substrate LSB based on the third direction DR3.

The connectors CNT may be disposed below the light source units LU. In an exemplary embodiment, the connectors CNT may be adjacent to the lower end of the light source substrate LSB in the third direction DR3, for example. The connectors CNT may be disposed on one side of the light source substrate LSB where the light source units LU are disposed. The thickness of each of the connectors CNT with respect to the second direction DR2 may be greater than the thickness of each of the light source units LU. Accordingly, the connectors CNT may protrude more than the light source units LU in the second direction DR2.

A power terminal (not shown) may be connected to the connectors CNT. Power may be provided to the light source units LU through the connectors CNT connected to the power terminal.

Referring to FIG. 6, the light source substrate LSB of the k-th light source LS may be inserted into the k-th groove GR. The light source units LU of the k-th light source LS may be disposed on the k-th protrusion part PT. The light source units LU of the k-th light source LS may be spaced apart from one side surface of the k-th QD glass QDG. One side surface of the k-th QD glass QDG may define one side of the k-th QD glass QDG. The light source units LU of the k-th light source LS may face one side surface of the k-th QD glass QDG.

The upper surface of the first support part SUP1 and the upper surface of the last protrusion part PT of the protrusion parts PT may be disposed on the same flat surface. The last QD glass QDG of the QD glasses QDG may be disposed on the first support part SUP1.

Figure 8:
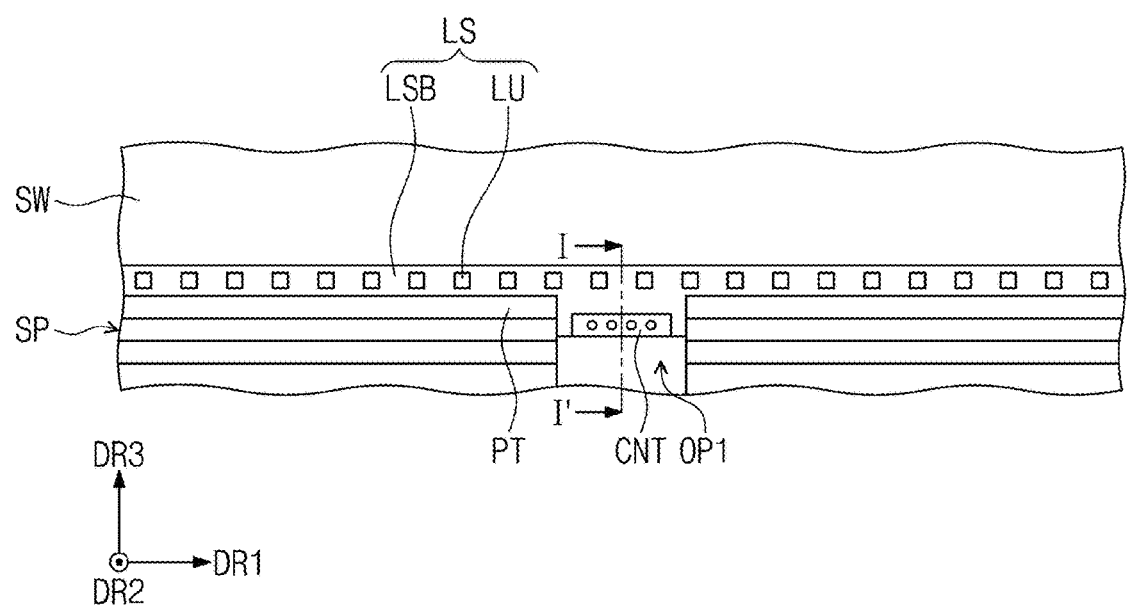
FIG. 8 is a view showing an arrangement state of one connector shown in FIG. 7.
Figure 9:
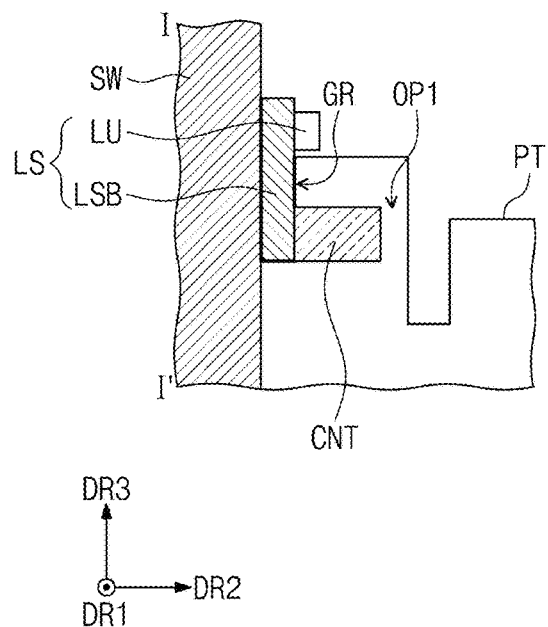
FIG. 9 is a cross-sectional view taken along line I-I' of FIG. 8.

FIG. 8 is a view showing an arrangement state of one connector shown in FIG. 7. FIG. 9 is a cross-sectional view taken along line I-I' of FIG. 8.

For convenience of explanation, FIGS. 8 and 9 show one light source LS disposed in the first groove GR and one connector CNT disposed in one first opening part OP1. Referring to FIGS. 8 and 9, a connector CNT may be disposed in the first opening part OP1. Substantially, a plurality of connectors CNT may be disposed in the plurality of first opening parts OP1, respectively. The size of the groove GR may be determined to correspond to the thickness of the light source substrate LSB. The light source units LU may be adjacent to the upper end of the light source substrate LSB and disposed on the protrusion part PT without being inserted into the grooves GR.

If the first opening part OP1 is not defined in the seating part SP and only the groove GR is defined, the light source substrate LSB may not be inserted into the groove GR due to a connector CNT adjacent to the lower end of the light source substrate LSB. Since the connector CNT is not inserted into the groove GR while being caught in the protrusion part PT as the connector CNT is larger than the groove GR, the light source substrate LSB may also not be inserted into the groove GR.

In an exemplary embodiment of the invention, as a first opening part OP1 is defined in the part of the seating part SP corresponding to the connector CNT and the connector CNT is disposed in the first opening part OP1, the light source substrate LSB may be easily inserted into the groove GR. Substantially, the first, second, and third opening parts OP1, OP2, and OP3 may be opening parts defined in the QD glass aging device AD in order to dispose the connectors CNT easily.

Figure 10:
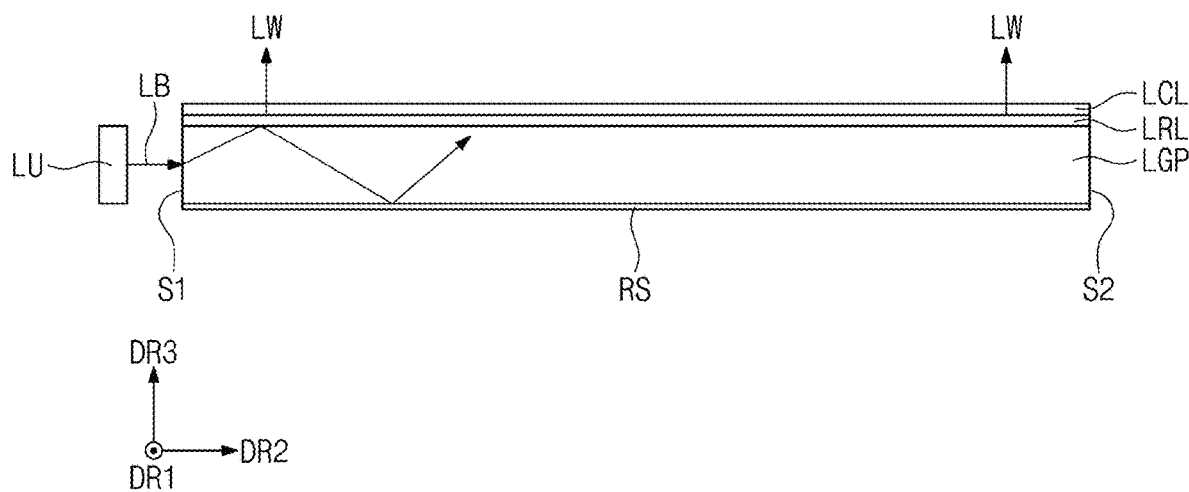
FIG. 10 is a view showing one QD glass and one light source unit shown in FIG. 6.
Figure 11:
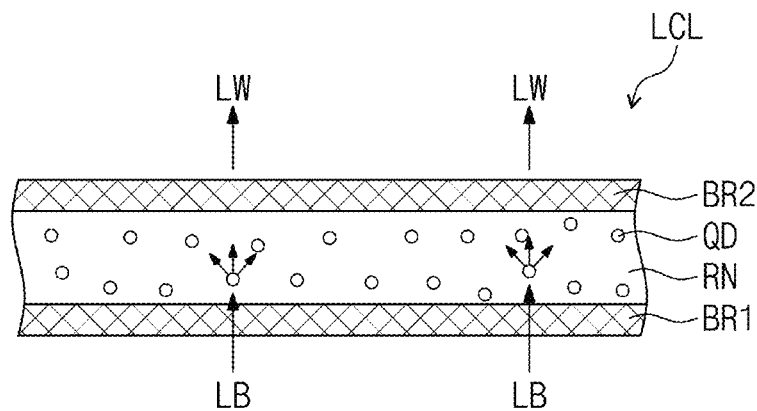
FIG. 11 is a view showing a cross-sectional configuration of the optical conversion layer shown in FIG. 10.

FIG. 10 is a view showing one QD glass and one light source unit shown in FIG. 6. FIG. 11 is a view showing a cross-sectional configuration of the optical conversion layer shown in FIG. 10.

Referring to FIG. 10, a QD glass QDG may include a light guide plate LGP, a low refraction layer LRL, an optical conversion layer LCL, and a reflective sheet RS. The light guide plate LGP may include glass, but not limited thereto, and the light guide plate LGP may include transparent plastic.

The low refraction layer LRL may be disposed on the light guide plate LGP, and the optical conversion layer LCL may be disposed on the low refraction layer LRL. Thus, a low refraction layer LRL may be disposed between the optical conversion layer LCL and the light guide plate LGP. The low refraction layer LRL may be coated on the upper surface of the light guide plate LGP. The optical conversion layer LCL may be coated on the low refraction layer LRL.

The low refraction layer LRL may have a smaller refractive index than that of the light guide plate LGP. The optical conversion layer LCL may have a higher refractive index than that of the light guide plate LGP. Illustratively, the refractive index of the light guide plate LGP may be 1.5, the refractive index of the low refraction layer LRL may be 1.25, and the refractive index of the optical conversion layer LCL may be 1.6, for example.

One side surface S1 of the light guide plate LGP facing the light source unit LU may be defined as the light-incident part S1 of the light guide plate LGP, and the opposite surface S2 of the light guide plate LGP opposite to the one side surface S1 may be defined as the light-out part S2 of the light guide plate LGP. The light source unit LU may generate the first light LB and provide it to the light guide plate LGP. Illustratively, the first light LB may be blue light, for example. The first light LB may travel to the light guide plate LGP through the light-incident part S1. The light guide plate LGP may guide the first light LB upwardly.

Since the low refraction layer LRL has a smaller refractive index than that of the light guide plate LGP, some light traveling toward the upper surface of the light guide plate LGP may be totally reflected at the interface between the light guide plate LGP and the low refraction layer LRL. In an exemplary embodiment, depending on the angle at which the first light LB is emitted from the light guide plate LGP, the first light LB may be provided to a low refraction layer LRL or may be totally reflected at an interface between a light guide plate LGP and a low refraction layer LRL, for example. The totally-reflected light may travel toward the light-out part S2 of the light guide plate LGP or toward the lower surface of the light guide plate LGP.

Light provided to the low refraction layer LRL may be provided to the optical conversion layer LCL. The optical conversion layer LCL may convert the first light LB into the second light LW and output it to the upper part. Illustratively, the second light LW may be white light, for example. The second light LW may diffuse in the optical conversion layer LCL and may be emitted to the upper part. The optical conversion layer LCL may include a plurality of quantum dots for converting blue light into white light.

The reflective sheet RS may be disposed at a lower part of the light guide plate LGP. The reflective sheet RS may be attached to the lower surface of the light guide plate LGP. The reflective sheet RS may reflect the first light LB traveling toward the lower surface of the light guide plate LGP upwardly. Therefore, the light traveling toward the lower surface of the light guide plate LGP may travel upwardly again without being lost to the outside.

Referring to FIG. 11, the optical conversion layer LCL includes a first barrier layer BR1, a second barrier layer BR2 disposed on the first barrier layer BR1, a resin RN disposed between the first barrier layer BR1 and the second barrier layer BR2, and a plurality of quantum dots QD accommodated in the resin RN.

The first and second barrier layers BR1 and BR2 may include an inorganic material. The first and second barrier layers BR1 and BR2 and the resin RN may have a larger refractive index than that of the light guide plate LGP. The refractive index 1.6 of the optical conversion layer LCL mentioned above may be a refractive index of the resin RN and the first and second barrier layers BR1 and BR2 may have a refractive index larger than that of the resin RN.

The optical conversion layer LCL may include quantum dots QD of different sizes depending on the type of light source LS to generate white light. In an exemplary embodiment, when the light source LS generates blue light LB, the optical conversion layer LCL may include quantum dots QD having a size that absorbs light of a blue wavelength band and emits light of a green wavelength band and quantum dots QD having a size that absorbs light of a blue wavelength band to emit light of a red wavelength band, for example.

The quantum dots QD may absorb the blue light provided from the light source LS and convert it into light in the green or red wavelength band. Further, a portion of the blue light may not be absorbed by the quantum dots QD. Accordingly, lights in the blue light, green light, and red light wavelengths may be mixed with each other in the optical conversion layer LCL to generate white light, which is the second light L2. The quantum dots QD may diffuse the second light LW.

Referring to FIG. 10, when a low refraction layer LRL and an optical conversion layer LCL are placed on a light guide plate LGP, the low refraction layer LRL and the optical conversion layer LCL may lower the transmittance of light, resulting in lower luminance. The luminance may be lowered from the light-incident part S1 to the light-out part S2. Therefore, the luminance uniformity of the QD glass QDG may be lowered.

To increase the luminance and luminance uniformity of QD glass QDG, an aging process for QD glass QDG may be performed. Hereinafter, with reference to FIGS. 12 and 13, an aging process for QD glass QDG will be described.

Figure 12:
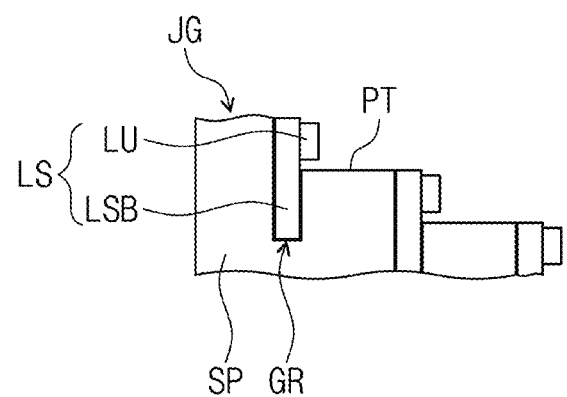
FIGS. 12 and 13 are views for explaining an exemplary embodiment of a method of aging QD glasses according to the invention.
Figure 13:
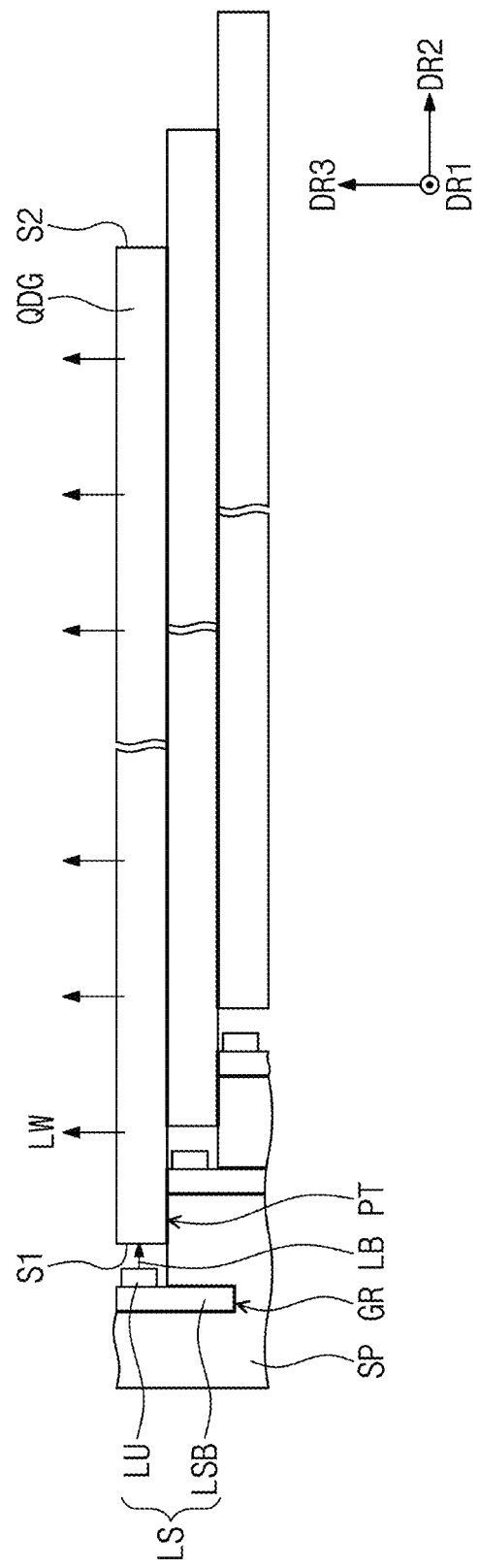

FIGS. 12 and 13 are views for explaining an exemplary embodiment of a method of aging QD glasses according to the invention.

For convenience of explanation, the light sources LS disposed in some grooves GR of the grooves GR and the protrusion parts PT and QD glasses QDG disposed in some protrusion parts PT are illustratively shown in FIGS. 12 and 13. Also, FIG. 13 will be described together with FIG. 10.

Referring to FIG. 12, a jig part JG may be prepared and light sources LS may be disposed in the grooves GR of the seating part SP, respectively. As described above, the light source substrates LSB may be inserted into the grooves GR, respectively, and the light source units LU may be disposed on the protrusion parts PT.

Referring to FIG. 13, after the light sources LS are disposed in the grooves GR, the QD glasses QDG may be disposed on the protrusion parts PT, respectively. Although not shown in the drawing, after the connectors CNT are disposed in the first opening parts OP1, a power terminal may be connected to the connectors CNT to supply power to the light source units LU.

The light source units LU may be driven to generate the first light LB. The first light LB may be provided to the QD glasses QDG. The first light LB may be converted into the second light LW in the QD glass QDG and outputted. The first light LB generated at the light source LS may be provided to the QD glass QDG for the first time. Hereinafter, the first and second lights LB and LW are referred to as light.

Referring to FIGS. 10 and 13, upwardly guided light from a light guide plate LGP may continuously transmit a low refraction layer LRL and an optical conversion layer LCL. When light penetrates the low refraction layer LRL and the optical conversion layer LCL for the first time, the luminance of the QD glasses QDG may be increased, and especially, the luminance of light-out part S2 with low luminance may be increased. As a result, the luminance uniformity of the QD glass QDG may be increased. The first time may be set to a time that the luminance of the QD glasses QDG no longer increases.

As a result, the QD glass aging device AD according to an exemplary embodiment of the invention may increase the efficiency of the aging process by simultaneously performing the aging process on a plurality of QD glasses QDG.

Figure 14:
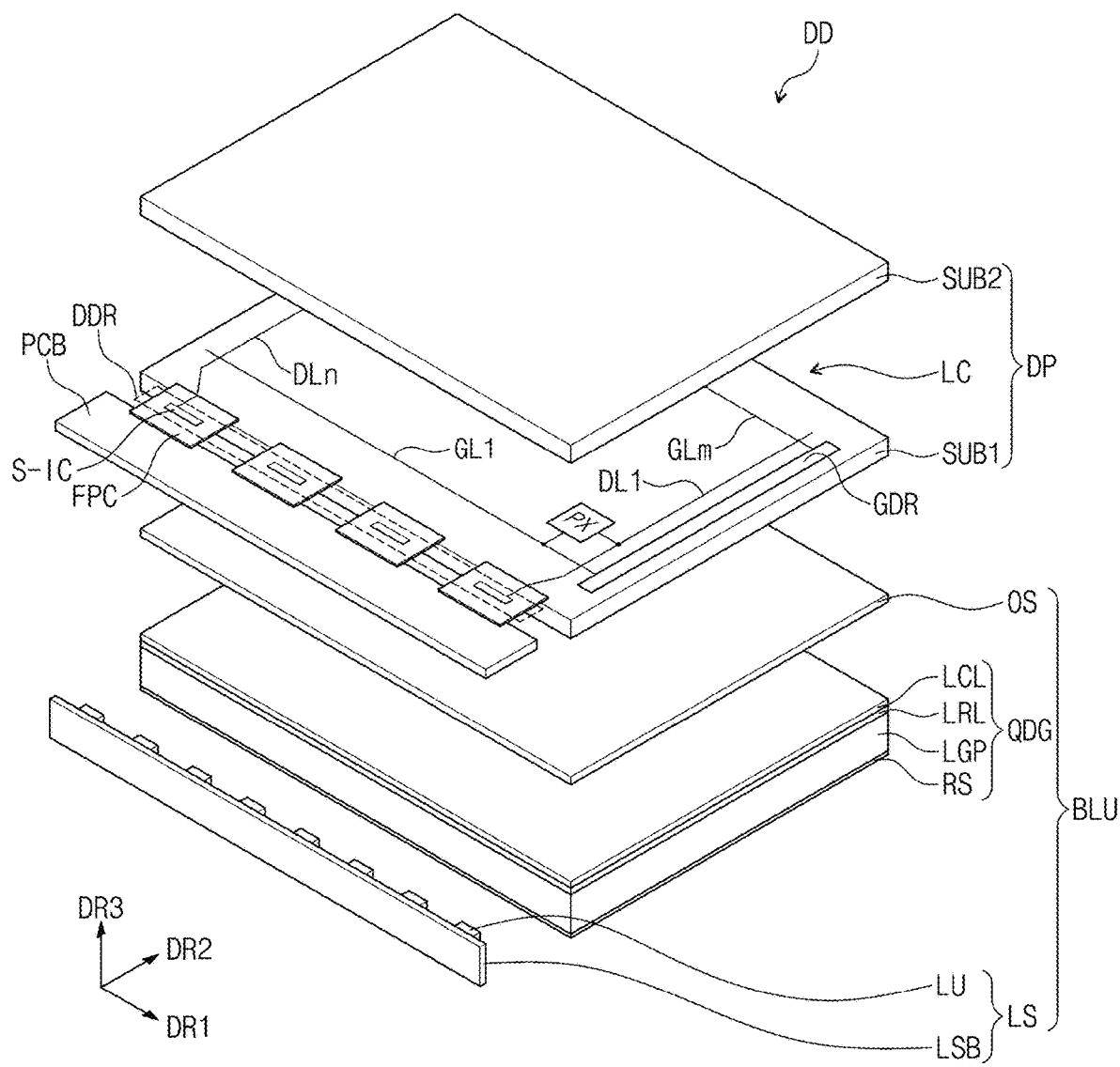
FIG. 14 is a view showing a configuration of a display device including a QD glass processed by an aging process.

FIG. 14 is a view showing a configuration of a display device including a QD glass processed by an aging process.

Referring to FIG. 14, a display device DD may include a display panel DP, a gate driver GDR, a data driver DDR, a printed circuit board PCB, and a backlight unit BLU. The display panel DP may have a rectangular shape having long sides in a first direction DR1 and short sides in a second direction DR2. However, the shape of the display panel DP may not be limited thereto.

The backlight unit BLU may generate the first light that is blue light, and may convert the first light into the second light that is white light and provide the light to the display panel DP. In an exemplary embodiment, the backlight unit BLU may be an edge type backlight unit, for example. The display panel DP may generate an image using the second light provided from the backlight unit BLU. The image may be provided to the user through the upper surface of the display panel DP.

The display panel DP includes a first substrate SUB1, a second substrate SUB2 facing the first substrate SUB1, and a liquid crystal layer LC disposed between the first substrate SUB1 and the second substrate SUB2. The first substrate SUB1 and the second substrate SUB2 may have a rectangular shape having long sides in a first direction DR1 and short sides in a second direction DR2.

Illustratively, FIG. 14 shows a liquid crystal display panel including a liquid crystal layer LC as a display panel DP, for example. However, the invention is not limited thereto, and various display panels for displaying images such as an electrophoretic display panel and an electrowetting display panel may be used as the display panel DP.

A plurality of pixels PX, a plurality of gate lines GL1 to GLm, and a plurality of data lines DL1 to DLn may be disposed on the first substrate SUB1 where m and n are natural numbers. For convenience of explanation, only one pixel PX is shown in FIG. 1, but a plurality of the pixels PX may be substantially disposed on the first substrate SUB1.

The gate lines GL1 to GLm and the data lines DL1 to DLn may be insulated from each other and intersect with each other. The gate lines GL1 to GLm may extend in the first direction DR1 and may be connected to a gate driving unit GDR. The data lines DL1 to DLn extend in the second direction DR2 and may be connected to the data driving unit DDR. The pixels PX may be connected to the gate lines GL1 to GLm and the data lines DL1 to DLn.

The gate driving unit GDR may be disposed on a predetermined portion of the first substrate SUB1 adjacent to one of the short sides of the first substrate SUB1. The gate driving unit GDR is provided at the same time as the transistors of the pixels PX and is disposed (e.g., mounted) on the first substrate SUB1 in the form of an amorphous silicon thin film transistor ("TFT") gate driver circuit ("ASG") or an oxide silicon TFT gate driver ("OSG").

However, the invention is not limited thereto, and the gate driving unit GDR may include a plurality of driving chips and may be disposed (e.g., mounted) on the flexible printed circuit boards to be connected to the first substrate SUB1 by a tape carrier package ("TCP") method. In an alternative exemplary embodiment, the driving chips of the gate driving unit GDR may be disposed (e.g., mounted) on the first substrate SUB1 by a chip on glass ("COG") method.

The data driving unit DDR may include a plurality of source driving chips S-IC disposed (e.g., mounted) on flexible circuit boards FPC. Illustratively, four source driving chips S-IC and four flexible printed circuit boards FPC are shown in FIG. 14, for example, but are not limited thereto. Depending on the size of the display panel DP, the number of source driving chips S-IC and flexible circuit boards FPC may vary.

One sides of the flexible printed circuit boards FPC may be connected to one side of the first substrate SUB1. One side of the first substrate SUB1 may be defined as any one of long sides of the first substrate SUB1. The other sides of the flexible circuit boards FPC, which are opposite sides of the one sides of the flexible circuit boards FPC, may be connected to a printed circuit board PCB. The source driving chips S-IC may be connected to the first substrate SUB1 and the printed circuit board PCB through flexible printed circuit boards FPC.

A timing controller (not shown) may be disposed on a printed circuit board PCB. The timing controller may be disposed (e.g., mounted) on a printed circuit board PCB in the form of an integrated circuit chip. The timing controller may be connected to the gate driving unit GDR and the data driving unit DDR through flexible printed circuit boards FPC. The timing controller may output a gate control signal, a data control signal, and image data.

The gate driving unit GDR may receive a gate control signal from a timing controller and may generate a plurality of gate signals in response to the gate control signal. The gate driving unit GDR may sequentially output the gate signals. The gate signals may be provided to the pixels PX through the gate lines GL1 to GLm.

The data driving unit DDR may receive the image data and the data control signal from a timing controller. The data driving unit DDR may generate and output analog data voltages corresponding to the image data in response to the data control signal. The data voltages may be provided to the pixels PX through the data lines DL1 to DLn.

The pixels PX may receive data voltages through the data lines DL1 to DLn in response to gate signals provided through the gate lines GL1 to GLm. As the pixel PX displays the grayscales corresponding to the data voltages, it may display an image.

The backlight unit BLU may include a light source LS, a QD glass QDG, and an optical sheet OS. As described above, the QD glass QDG may include a light guide plate LGP, a low refraction layer LRL, an optical conversion layer LCL, and a reflective sheet RS. Since the configuration of the QD glass QDG is described in detail above, a description thereof will be omitted.

The light source LS may be substantially the light source LS shown in FIG. 7, and connectors CNT are omitted for convenience of description. Some of the light source units LU are shown in FIG. 7. Since the configuration of the light source LS is also described in detail above, a description thereof will be omitted. The first light generated in the light source units LU is provided to the QD glass QDG, and the QD glass QDG may convert the first light to the second light and emit the light upwardly.

The optical sheet OS may be disposed between the display panel DP and the optical conversion layer LCL. The optical sheet OS may include a diffusion sheet (not shown) and a prism sheet (not shown) disposed on the diffusion sheet.

The diffusion sheet may diffuse the second light provided from the optical conversion layer LCL. The prism sheet may condense the second light diffused in the diffusion sheet in the third direction DR3. The second light passing through the prism sheet may be provided to the display panel DP in the third direction DR3 to have a uniform luminance distribution.

Figure 15:
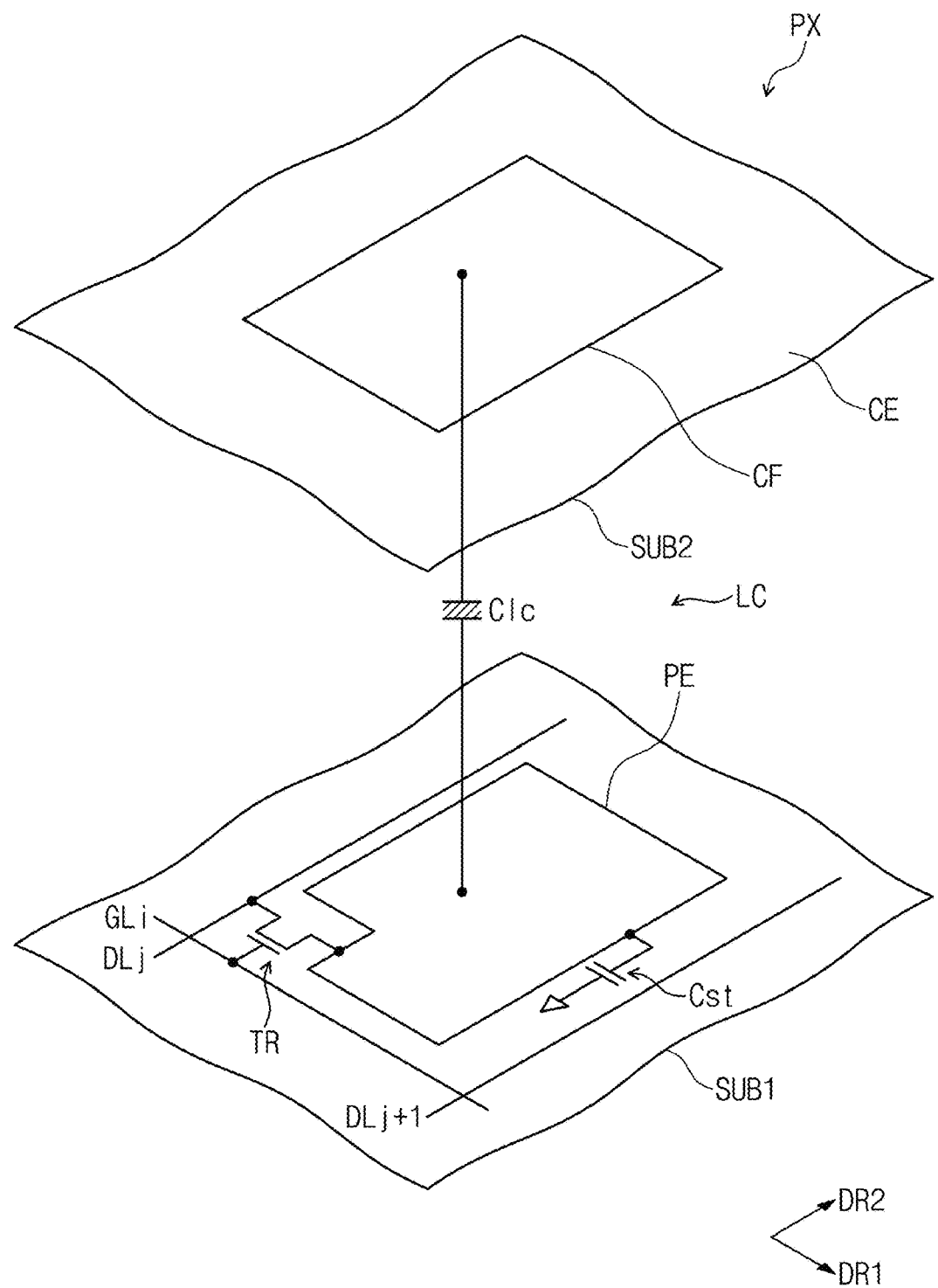
FIG. 15 is a view illustrating a configuration of a pixel shown in FIG. 14.

FIG. 15 is a view illustrating a configuration of a pixel shown in FIG. 14.

For convenience of description, in FIG. 15, a pixel PX connected to the gate line GLi and the data line DLj is shown, and the configuration of the other pixels PX of the display panel DP will be the same as that of the pixel PX shown in FIG. 15.

Referring to FIG. 15, the pixel may include a transistor TR connected to the gate line GLi and the data line DLj where i and j are natural numbers, a liquid crystal capacitor Clc connected to the transistor TR, and a storage capacitor Cst connected in parallel to the liquid crystal capacitor Clc. In another exemplary embodiment, the storage capacitor Cst may be omitted.

The transistor TR may be disposed on the first substrate SUB1. The transistor TR may include a gate electrode (not shown) connected to the gate line GLi, a source electrode (not shown) connected to the data line DLj, and a drain electrode (not shown) connected to the liquid crystal capacitor Clc and the storage capacitor Cst.

The liquid crystal capacitor Clc may include a pixel electrode PE disposed on the first substrate SUB1, a common electrode CE disposed on the second substrate SUB2, and a liquid crystal layer LC disposed between the pixel electrode PE and the common electrode CE. The liquid crystal layer LC may serve as a dielectric. The pixel electrode PE may be connected to the drain electrode of the transistor TR.

The pixel electrode PE has a non-slit structure in FIG. 15 but the invention is not limited thereto. Thus, the pixel PE may have a slit structure including a cross-shaped branch part and a plurality of branch parts extending radially from the cross-shaped branch part.

The common electrode CE may be disposed on the entire lower part of the second substrate SUB2. However, the invention is not limited thereto, and the common electrode CE may be disposed on the first substrate SUB1. In such a case, a slit may be defined in at least one of the pixel electrode PE and the common electrode CE.

The storage capacitor Cst may include a pixel electrode PE, a storage electrode (not shown) branched from a storage line (not shown), and an insulating layer disposed between the pixel electrode PE and the storage electrode. The storage line may be disposed on the first substrate SUB1 and may be disposed in the same layer as the gate lines GL1 to GLm. The storage electrode may partially overlap the pixel electrode PE.

In an exemplary embodiment, the pixel PX may further include a color filter CF representing one of red, green, and blue colors, for example. However, the invention is not limited thereto, and in another exemplary embodiment, the pixel PX may further include a color filter CF representing various other colors. As an exemplary embodiment, as shown in FIG. 15, the color filter CF may be disposed on the second substrate SUB2. However, the invention is not limited thereto, and the color filter CF may be disposed on the first substrate SUB1.

The transistor TR may be turned on in response to the gate signal provided through the gate line GLi. The data voltage received via the data line DLj may be provided to the pixel electrode PE of the liquid crystal capacitor Clc through the turned-on transistor TR. A common voltage may be applied to the common electrode CE.

An electric field may be generated between the pixel electrode PE and the common electrode CE due to a difference in the voltage levels of a data voltage and a common voltage. The liquid crystal molecules of the liquid crystal layer LC may be driven by an electric field generated between the pixel electrode PE and the common electrode CE. The light transmittance is adjusted by the liquid crystal molecules driven by the electric field, so that the image may be displayed.

A storage voltage having a constant voltage level may be applied to a storage line. However, the invention is not limited to this, and the storage line may receive the common voltage. The storage capacitor Cst may compensate the charged amount of the liquid crystal capacitor Clc.

A QD glass aging device and an aging method thereof according to an exemplary embodiment of the invention may increase the efficiency of an aging process by simultaneously performing the aging process on a plurality of QD glasses QDG.

Although the exemplary embodiments of the invention have been described, it is understood that the invention should not be limited to these exemplary embodiments but various changes and modifications may be made by one ordinary skilled in the art within the spirit and scope of the invention as hereinafter claimed.

What is claimed is:

1. A quantum dot glass aging device comprising:
a bottom part including a flat surface defined by a first direction and a second direction intersecting the first direction;
a side wall part including a side surface defined by the first direction and a third direction intersecting the bottom part; and
a seating part disposed between the bottom part and the side wall part,
wherein the seating part comprises a plurality of protrusion parts extending in the first direction and arranged in the second direction, the plurality of protrusion parts on which a plurality of quantum dot glasses is disposed,
wherein a plurality of light sources is disposed in a plurality of grooves defined between the plurality of protrusion parts and between the side wall part and a first protrusion part adjacent to the side wall part,
wherein heights of upper surfaces of the plurality of protrusion parts gradually decrease from the side wall part to the bottom part.

2. The quantum dot glass aging device of claim 1, wherein depths of the plurality of grooves gradually decrease from the side wall part to the bottom part.

3. The quantum dot glass aging device of claim 1, wherein the heights of the upper surfaces of the plurality of protrusion parts are higher than that of the bottom part.

4. The quantum dot glass aging device of claim 1, wherein an order of the plurality of protrusion parts increases from the side wall part to the bottom part, and one side of a k-th quantum dot glass of the plurality of quantum dot glasses is disposed on a k-th protrusion part of the plurality of protrusion parts.

5. The quantum dot glass aging device of claim 4, wherein the k-th quantum dot glass is disposed on a (k+1)-th light source and a (k+1)-th quantum dot glass.

6. The quantum dot glass aging device of claim 5, wherein the k-th quantum dot glass comprises:

a first portion disposed on the k-th protrusion part and the (k+1)-th light source; and a second portion disposed on the (k+1)-th quantum dot glass, wherein a lower surface of the second portion of the k-th quantum dot glass contacts an upper surface of the (k+1)-th quantum dot glass.

7. The quantum dot glass aging device of claim 4, wherein a k-th light source of the plurality of light sources comprises:

a light source substrate extending in the first direction; and a plurality of light source units disposed on the light source substrate and facing one side surface of the k-th quantum dot glass, wherein the light source substrate is inserted into a k-th groove of the plurality of grooves, and the plurality of light source units is disposed on the k-th protrusion part.

8. The quantum dot glass aging device of claim 7, wherein the k-th light source further comprises a plurality of connectors coupled to the light source substrate, wherein the plurality of connectors is disposed in a plurality of first opening parts defined in the seating part, and a number of the plurality of connectors is less than a number of the plurality of light source units.

9. The quantum dot glass aging device of claim 8, wherein the plurality of connectors is disposed below the plurality of light source units.

10. The quantum dot glass aging device of claim 8, wherein the plurality of first opening parts is arranged in the first direction and extend in the second direction.

11. The quantum dot glass aging device of claim 8, wherein a plurality of second opening parts defined in predetermined portions of the bottom part adjacent to the seating part corresponds to the plurality of first opening parts, respectively, and each of the plurality of second opening parts is defined as an integral space together with a corresponding first opening part of the plurality of first opening parts.

12. The quantum dot glass aging device of claim 11, further comprising:

a first support part disposed on the bottom part and extending further in the second direction than the bottom part, the first support part where a plurality of third opening parts overlapping the plurality of second opening parts is defined; and a second support part spaced apart from the bottom part and disposed below the first support part.

13. The quantum dot glass aging device of claim 12, wherein a last quantum dot glass of the plurality of quantum dot glasses is disposed on the first support part.

14. The quantum dot glass aging device of claim 12, wherein an upper surface of the first support part and an upper surface of a last protrusion part of the plurality of protrusion parts are disposed on a same flat surface.

15. The quantum dot glass aging device of claim 1, wherein each of the plurality of quantum dot glasses comprises:

a light guide plate;

a low refraction layer disposed on the light guide plate; and an optical conversion layer disposed on the low refraction layer.

16. The quantum dot glass aging device of claim 1, further comprising a plurality of heat dissipating parts disposed on a back surface of the side wall part which is an opposite surface of a front surface of the side wall part adjacent the seating part.

17. The quantum dot glass aging device of claim 16, wherein each of the plurality of heat dissipating parts comprises:

a body part where an opening part is defined; and a fan disposed in the opening part.

18. A quantum dot glass aging method comprising:

preparing a jig part comprising a seating part including a plurality of protrusion parts extending in a first direction and arranged in a second direction intersecting the first direction, a side wall part extending upwardly from a first side of opposing sides of the seating part facing each other in the second direction, and a bottom part extending from a second side of the opposing sides of the seating part in the second direction;

disposing a plurality of light sources in a plurality of grooves defined between the plurality of protrusion parts and between the side wall part and a first protrusion part adjacent to the side wall part;

disposing a plurality of quantum dot glasses on the plurality of protrusion parts, respectively; and providing light generated from the plurality of light sources to the plurality of quantum dot glasses for a first time, wherein the plurality of protrusion parts is disposed higher than the bottom part, wherein heights of the plurality of protrusion parts gradually decrease from the side wall part to the bottom part, wherein depths of the plurality of grooves gradually decrease from the side wall part to the bottom part.

19. The method of claim 18, further comprising rotating a plurality of fans disposed on a back surface of the side wall part, which is an opposite side to a front surface of the side wall part adjacent to the seating part, to release a heat of the seating part.

20. The method of claim 18, wherein a k-th light source of the plurality of light sources comprises:

a light source substrate extending in the first direction and inserted in a k-th groove of the plurality of grooves; and a plurality of light source units disposed on the light source substrate and disposed on a k-th protrusion part of the plurality of protrusion parts and facing one side surface of a k-th quantum dot glass of the quantum dot glasses, wherein the k-th quantum dot glass is disposed on the k-th protrusion part, a (k+1)-th light source, and a (k+1)-th quantum dot glass, and a last quantum dot glass of the quantum dot glass is disposed on the bottom part to be disposed on a first support part extending further in the second direction than the bottom part.

* * * * *